Sept. 1, 1925.
C. J. KAYKO
1,552,310
ELECTRODE FOR DISCHARGE TUBES
Filed July 24, 1923
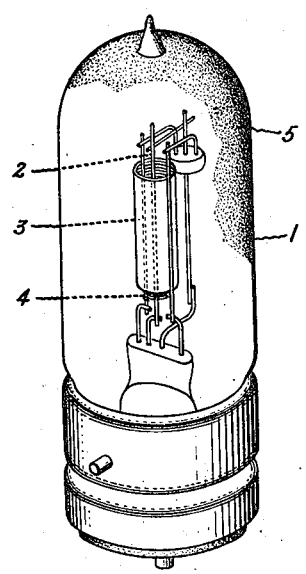
Inventor:
Charles J. Kayko,
by *[signature]*
His Attorney.

Patented Sept. 1, 1925.

1,552,310

UNITED STATES PATENT OFFICE.

CHARLES J. KAYKO, OF SCHENECTADY, NEW YORK, ASSIGNOR TO GENERAL ELECTRIC COMPANY, A CORPORATION OF NEW YORK.

ELECTRODE FOR DISCHARGE TUBES.

Application filed July 24, 1923. Serial No. 653,468.

*To all whom it may concern:*

Be it known that I, CHARLES J. KAYKO, a citizen of the United States, residing at Schenectady, in the county of Schenectady, State of New York, have invented certain new and useful Improvements in Electrodes for Discharge Tubes, of which the following is a specification.

The present invention relates to the constitution of cathodes for electrical discharge devices, as for example, radio detectors, rectifiers and the like.

It is the object of my invention to provide a cathode material capable of high electron emission at an operating temperature which is relatively low and which therefore permits of operation of the devices by a low heating current, for example, such as an ordinary primary battery is capable of furnishing.

Heretofore, alkaline earth oxides have been applied upon the surface of electrodes which were intended to emit electrons, but these surface coatings tend to flake off, making the device short lived. The beneficial effect of such materials of high electron emissivity can be obtained by an incorporation of these materials with a base or cathode material which is capable of being fashioned into desired form without volatilizing the active material.

In accordance with my invention a compound of an alkaline earth or alkali metal which is not readily volatilized, as, for example, an oxide or a tungstate, is incorporated into the body of a cathode by mixing said compound in a finely divided state with the main constituent of the cathode, as distinguished from a surface application.

In accordance with a further feature of my invention, the electron-emitting cathodes embodying my invention are made by a method involving temperatures at which the active material is retained in the cathode.

My invention may best be understood from the following specific example relating to the preparation of cathodes of nickel, molybdenum, or other materials capable of operation at an elevated temperature.

About 95 parts by weight of finely divided metallic nickel, or an equivalent amount of nickel oxide, NiO, are admixed with about 5 to 10 parts by weight of the carbonate or sulphate of barium or strontium, sodium tungstate, or other non-volatile compound of a metal having highly electropositive characteristics with the addition of a suitable binder, for example, one of the binders utilized heretofore in the production of incandescent lighting filaments, in sufficient amount to form a squirtable mass. The resulting plastic mass is extruded into desired filamentary form, and the binder is removed in accordance with one of the processes heretofore used. For example, when employing a carbonaceous binder such as nitrated cellulose (bioloidin) the filaments may be fired at a high enough temperature to carbonize the binder and they are then decarbonized in an atmosphere of moist hydrogen. I find that it is essential to subject the cathode material during preparation and also during subsequent operation to a temperature no higher than about 1700° C. to prevent volatilization of the active material. In the case of nickel the sintering and treatment temperatures are much lower as the melting point of nickel is about 1450° C.

Nickel electrodes thus made containing strontium as an elementary constituent, may be operated at temperatures below the melting point of nickel—say, below 1400° C. with a high electron emission. At 1200° C. the electron emission ranges from about 0.1 to 1.0 ampere per sq. cm. of surface, and may be higher under favorable conditions. Pure nickel at this temperature has a scarcely perceptible electron emission. Cathodes consisting of a base material having a higher melting point than nickel may be operated at a higher temperature but below the temperature at which the alkaline earth metal is volatilized. Filaments consisting essentially of molybdenum, and containing about 10% of barium oxide, prepared in accordance with my invention have given an electron emission of about .028 amperes per sq. cm. with an energy consumption of about 1.76 watts per sq. cm. of electrode surface. The efficiency of electron emission is increased by the presence of the barium compound considerably more than a million fold over the emission obtainable under the same conditions with molybdenum.

When filaments made in this way are mounted as cathodes in an electron discharge device, such as shown for example in the drawing, comprising a bulb 1, a cathode 2, an anode 3 and a grid 4, the greatest precautions being taken to thoroughly evacuate the bulb and contained parts, especially to remove water vapor. Preferably, but not necessarily, a material highly reactive in water vapor, as for example, magnesium or calcium, is introduced into the bulb, for example, as a film 5 on the bulb wall. Suitable leading-in conductors and terminals are provided as usual but as they do not constitute a part of my present invention they are not described in detail. The advantages of my invention are not limited to radio devices, the drawing merely showing for illustrative purposes a device adapted for radio reception.

What I claim as new and desire to secure by Letters Patent of the United States, is:—

1. The method of making cathodes for electron discharge devices which consists in mixing a difficultly vaporizable compound of a highly positive metal together with a cathode material in finely divided state which is capable of being sintered at a temperature insufficient to volatilize said compound, and fashioning the mixture into desired form at a temperature at which volatilization of said compound is avoided.

2. The method of making cathodes for electron discharge devices which consists in preparing a plastic mass comprising a compound of an alkaline earth metal, a metal capable of being sintered at a temperature insufficient to volatilize said compound, and a binder, forming the same into filamentary form and removing the binder at a temperature too low to volatilize said alkaline-earth compound.

3. The method of making cathodes for electron discharge devices which consists in mixing by weight about 95 parts finely divided nickel, about 5 parts finely divided barium carbonate, and sufficient carbonizable binder to form a plastic mass, squirting the mixture to filamentary form, carbonizing said binder and removing the carbon residue.

4. An electron discharge device containing a cathode comprising a compound of a highly positive metal and a base metal capable of being sintered at a temperature insufficient to volatilize said compound.

5. An electron emitting cathode consisting largely of a metal capable of being sintered below about 1700° C. and of a lesser proportion of a difficultly vaporizable compound of a highly positive metal, said compound being incorporated into the interior of said cathode.

6. An electron-emitting cathode consisting largely of nickel containing intimately incorporated therewith a compound of a highly positive metal which is sufficiently refractory to be retained in said cathode at a temperature at which the electron emission is substantial.

7. An electron discharge device provided with a nickel cathode containing an alkaline-earth compound incorporated throughout the mass of said cathode, and having at a temperature of about 1200° C. an electron emission of about 0.1 to 1.0 ampere per square cm. of surface.

8. An electron discharge device provided with a cathode consisting substantially of nickel and having a barium compound distributed in a finely divided state throughout the body of said cathode.

In witness whereof, I have hereunto set my hand this 23rd day of July, 1923.

CHARLES J. KAYKO.